US010365543B2

(12) United States Patent
O'Neill et al.

(10) Patent No.: US 10,365,543 B2
(45) Date of Patent: Jul. 30, 2019

(54) HOLDER FOR MOBILE DEVICES

(71) Applicant: Portero Holdings, LLC, Lake Forest, CA (US)

(72) Inventors: Patrick D. O'Neill, Huntington Beach, CA (US); Chong Pak, Lakewood, CA (US); Jason Patrick, Long Beach, CA (US); Joshua Cantor, Huntington Beach, CA (US); Ryan Nguyen, Fountain Valley, CA (US); Daniel Arato, Los Angeles, CA (US)

(73) Assignee: Portero Holdings, LLC, Lake Forest, CA (US)

( * ) Notice: Subject to any disclaimer, the term of this patent is extended or adjusted under 35 U.S.C. 154(b) by 0 days.

(21) Appl. No.: 15/395,974

(22) Filed: Dec. 30, 2016

(65) Prior Publication Data

US 2019/0064638 A1 Feb. 28, 2019

Related U.S. Application Data

(60) Provisional application No. 62/290,622, filed on Feb. 3, 2016, provisional application No. 62/273,149, filed on Dec. 30, 2015.

(51) Int. Cl.
*A45F 5/10* (2006.01)
*G03B 17/56* (2006.01)

(52) U.S. Cl.
CPC ........... *G03B 17/561* (2013.01); *A45F 5/10* (2013.01); *G03B 17/563* (2013.01); *A45F 2005/108* (2013.01); *A45F 2200/0516* (2013.01); *A45F 2200/0525* (2013.01); *A45F 2200/0533* (2013.01)

(58) Field of Classification Search
CPC .................................................. G03B 17/561
USPC ............................................................. 396/420
See application file for complete search history.

(56) References Cited

U.S. PATENT DOCUMENTS

| | | | | |
|---|---|---|---|---|
| 6,708,887 B1 * | 3/2004 | Garrett | ................. | G06F 1/1626 |
| | | | | 235/462.45 |
| 6,999,797 B2 * | 2/2006 | Crawford | .............. | G06F 1/1632 |
| | | | | 455/343.6 |
| 7,845,602 B1 * | 12/2010 | Young | .................. | F16B 7/1409 |
| | | | | 248/125.8 |
| 2007/0292125 A1 * | 12/2007 | Saxton | ................. | G03B 17/561 |
| | | | | 396/420 |
| 2010/0202769 A1 * | 8/2010 | Polster | ................... | G03B 17/38 |
| | | | | 396/420 |
| 2011/0080563 A1 * | 4/2011 | Greaves | ............... | F16M 11/123 |
| | | | | 352/243 |
| 2013/0037682 A1 * | 2/2013 | Wang | ................... | F16M 11/041 |
| | | | | 248/371 |
| 2016/0069512 A1 * | 3/2016 | Grieve | ...................... | A45F 5/00 |
| | | | | 294/142 |

(Continued)

*Primary Examiner* — Clayton E. LaBalle
*Assistant Examiner* — Linda B Smith
(74) *Attorney, Agent, or Firm* — Dorsey & Whitney LLP

(57) ABSTRACT

A removably attachable handle accessory is disclosed for use with mobile electronic devices. A user may attach or otherwise install the removably attachable handle on a mobile electronic device. A pivot portion facilitates adjustment of the orientation of the mobile electronic device with respect to a grip portion of the handle. Additionally, the pivot portion includes an opening into which a user may insert a finger to aid in maintaining a secure grip, improving comfort, and the like.

25 Claims, 13 Drawing Sheets

(56) References Cited

U.S. PATENT DOCUMENTS

2016/0373155 A1* 12/2016 O'Neill .................. A45C 11/00
2017/0227162 A1* 8/2017 Saika ..................... F16M 13/02

* cited by examiner

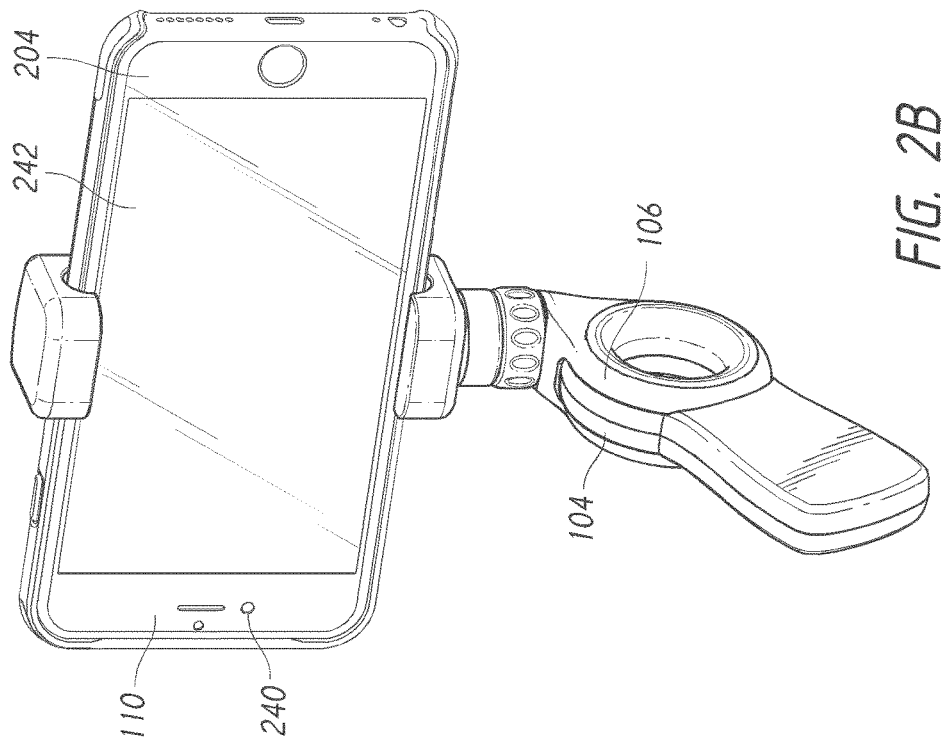
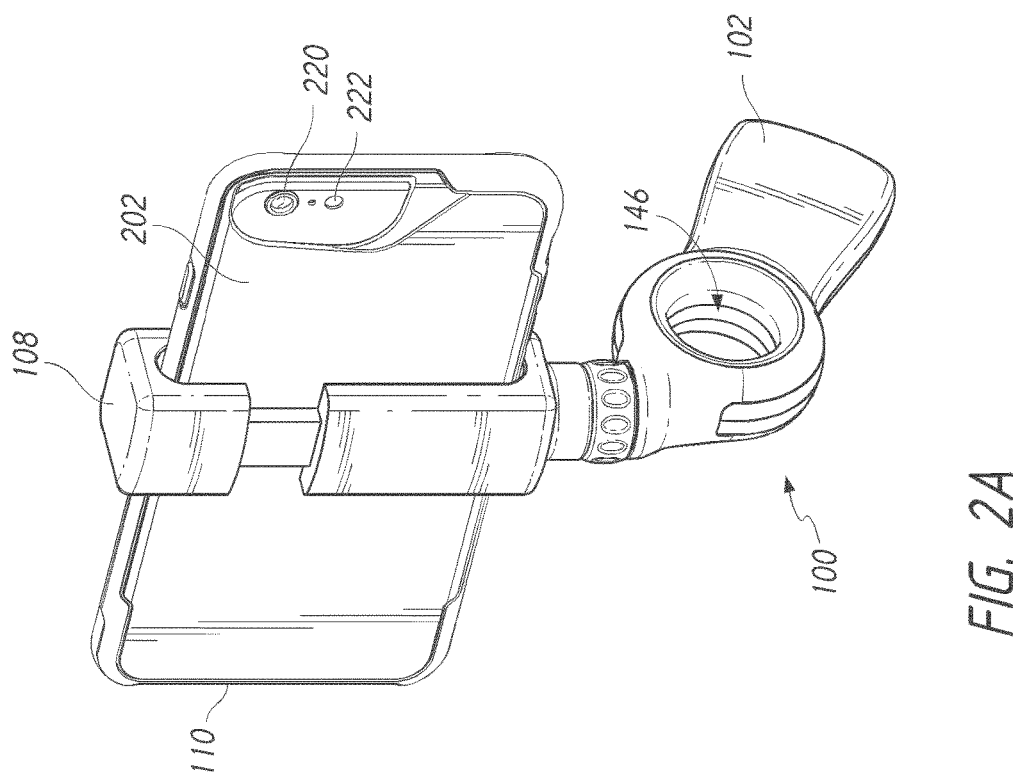
FIG. 2B
FIG. 2A

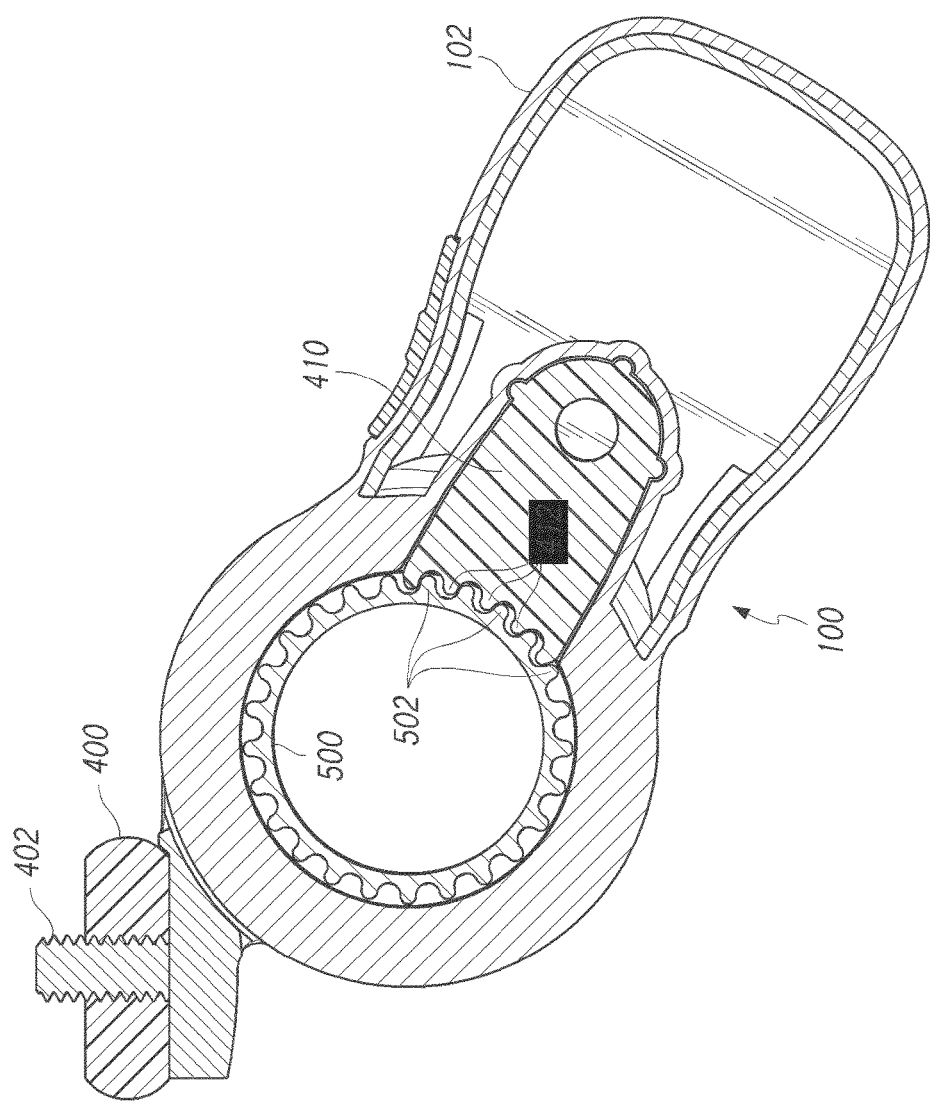
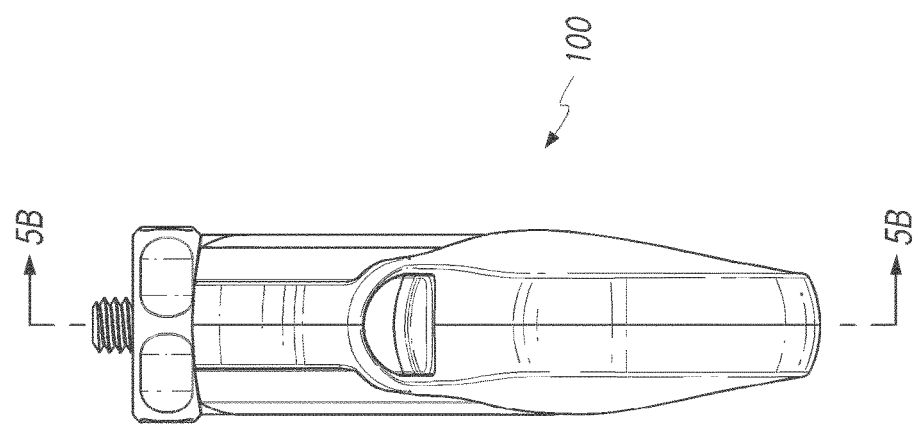

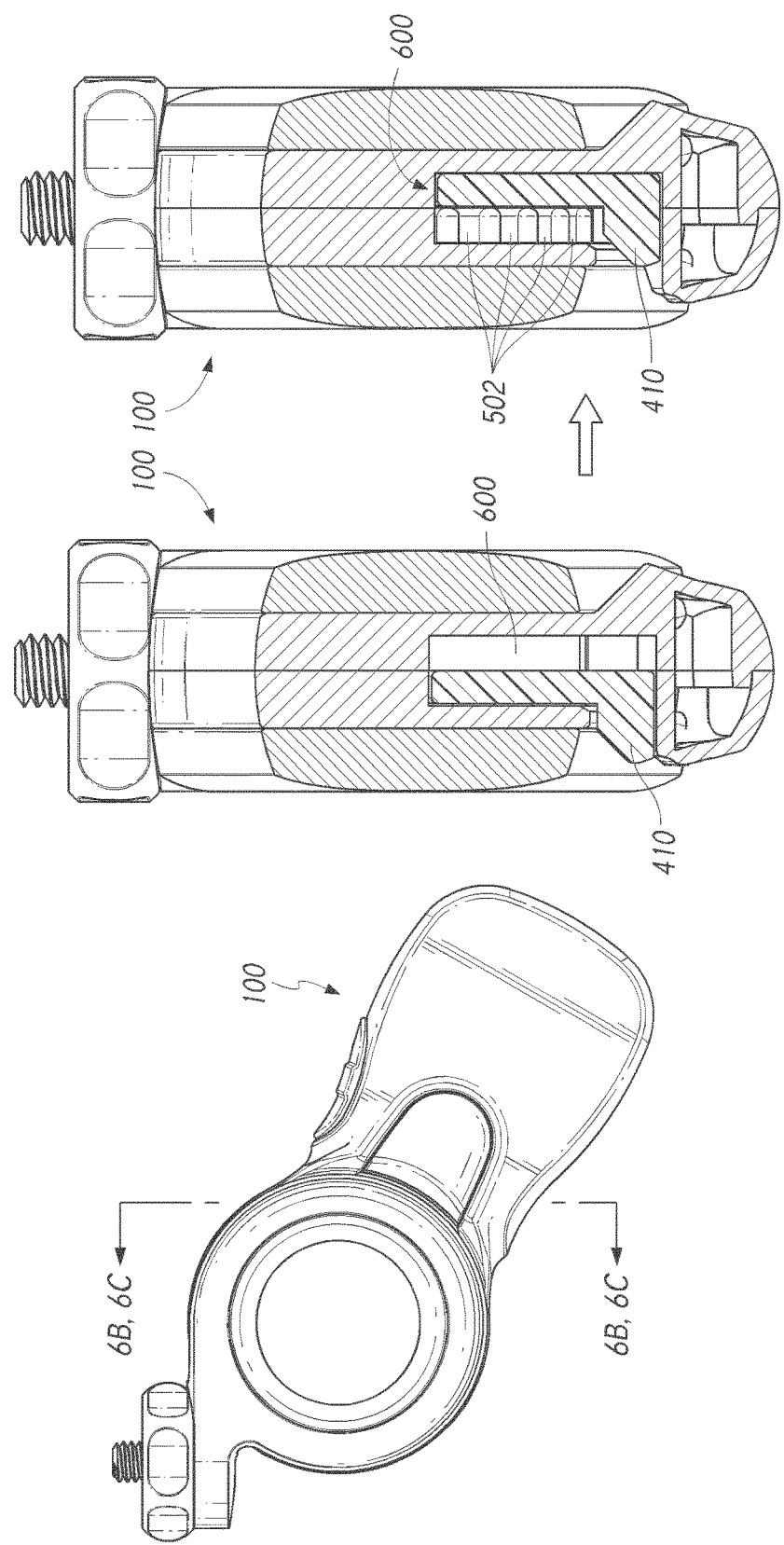

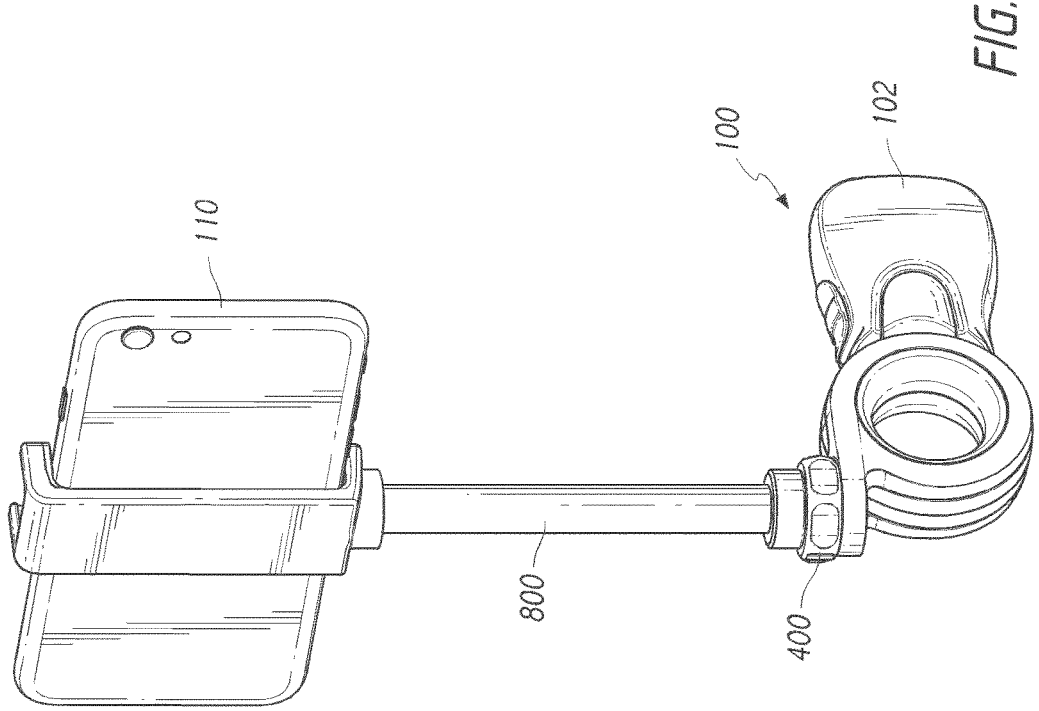

HOLDER FOR MOBILE DEVICES

CROSS-REFERENCE TO RELATED APPLICATIONS

This application claims the benefit of U.S. Provisional Application No. 62/273,149, filed Dec. 30, 2015, and U.S. Provisional Patent Application No. 62/290,622, filed Feb. 3, 2016, both of which are hereby incorporated by reference in their entireties.

BACKGROUND

Field of the Inventions

The inventions relate generally to accessories for mobile electronic devices (e.g., mobile telephones, mobile texting devices, electronic pad devices, laptop computers, desktop computers, gaming devices, and/or devices capable of linking electronically to another device or to a network such as the Internet, etc.), and specifically to holders for mobile electronic devices.

Description of the Related Art

In recent years, many advances in computer networking and processing technology have made it possible for mobile electronic devices to include onboard cameras that permit users to capture images. In many cases, these images can be stored, processed, and transmitted. However, there are many design constraints on mobile electronic devices that can affect the overall user experience when performing photography and/or videography using such onboard cameras. Consequently, many mobile electronic devices are undesirable or unacceptable for extended use in photography and/or videography.

For example, mobile electronic devices, especially mobile electronic communication devices, are generally designed to be small, compact, and sleek for convenient storing and carrying. However, when using such devices for photography or videography, it can be difficult to hold them in an ideal position and orientation for extended periods to capture a desired image, especially while keeping the onboard camera or cameras free from visual blockage by the user's hands. It can also be difficult to conveniently actuate the mobile electronic device to capture an image when both of the user's hands are occupied with securely holding the device in the proper position and orientation.

SUMMARY

A removably-attachable handle accessory is provided for use with mobile electronic devices. A user may attach or otherwise install the removably attachable handle on a mobile electronic device. To facilitate use of the mobile electronic device for photography and various other operations, a pivot portion facilitates adjustment of the orientation of the mobile electronic device with respect to a grip portion of the handle. Additionally, the pivot portion includes an opening into which a user may insert a finger to aid in maintaining a secure grip, improving comfort, and the like.

BRIEF DESCRIPTION OF THE DRAWINGS

Certain embodiments of the inventions will now be discussed in detail with reference to the following figures. These figures are provided for illustrative purposes only, and the inventions are not limited to the subject matter illustrated in the figures.

FIGS. 2A and 2B illustrate different views of a user-adjustable handle attached to a mobile electronic device.

FIGS. 5A and 5B illustrate a user-adjustable handle and a cross section thereof, showing various internal components of the handle.

FIGS. 6A, 6B, and 6C illustrate a user-adjustable handle and cross sections thereof, showing various internal component of the handle.

FIG. 8 illustrates an example of a user-adjustable handle with an extension member.

DETAILED DESCRIPTION OF ILLUSTRATIVE EMBODIMENTS

Figure 1:
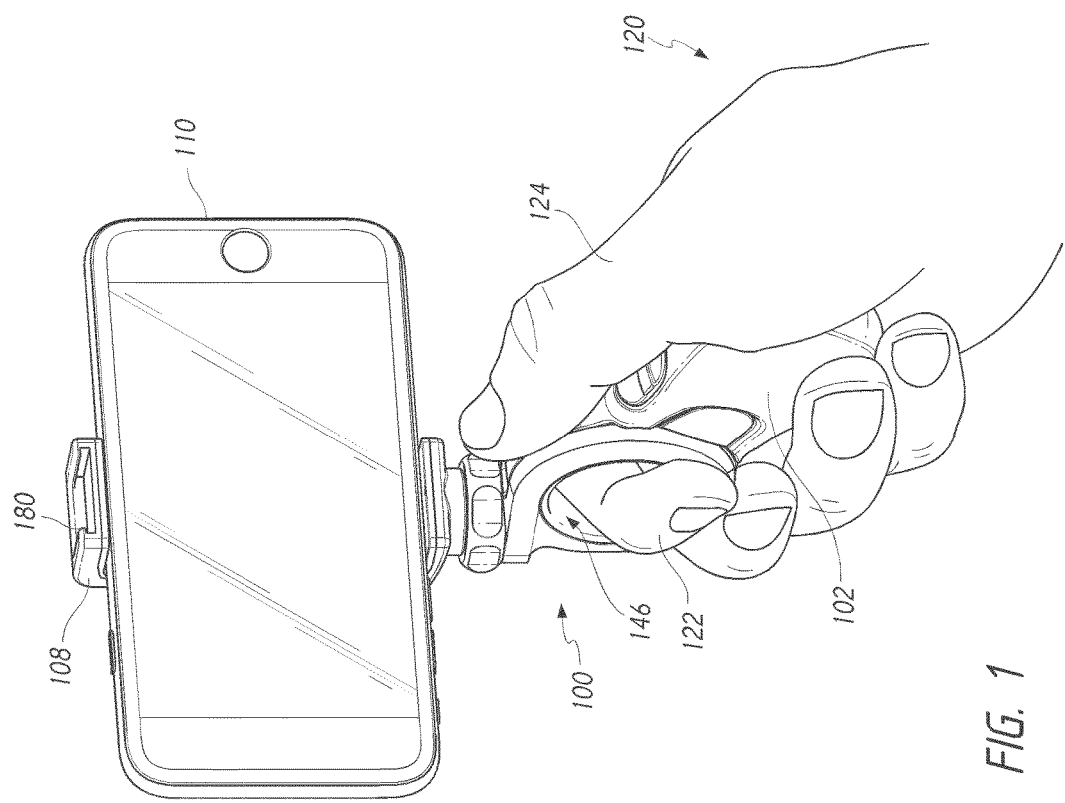
FIG. 1 illustrates a user holding a user-adjustable handle attached to a mobile electronic device.

The following detailed description is now directed to certain specific illustrative embodiments of the disclosure. In this description, reference is made to the drawings wherein like parts are designated with like numerals throughout the description and the drawings. The inventions are not limited to the examples expressly illustrated in the drawings or described in this specification. As used herein, a mobile device refers to a device that can be readily and conveniently carried by a user from one place to another; a mobile electronic device is a mobile device that comprises one or more electronic capabilities; a mobile electronic communication device is a mobile electronic device that comprises one or more communication features that permit the device to communicate with one or more other devices.

Any feature, structure, step, material, or component that is illustrated and/or described in any embodiment in this specification can be used separately from the embodiment in which it is disclosed and/or illustrated, either individually, or in combination with another embodiment described and/or illustrated in this specification, or in combination with an embodiment that is not described and/or illustrated in this specification. For example, without limitation, any embodiment in this specification can include an accessory attachment region, as illustrated in FIG. 1, even if not illustrated or described with respect to a particular embodiment. As another example, any embodiment in this specification can be configured to be attached to, and detached from, a mobile electronic device by a user without requiring tools or separate mounting components (e.g., screws). No feature, structure, step, material, or component disclosed and/or illustrated in this specification is essential or indispensable.

Referring to FIGS. 1, 2A, 2B, 3A, 3B, and 3C ("FIGS. 1-3"), an example of a holder for one or more mobile devices is illustrated. In some embodiments, as shown, the holder can be a user-adjustable handle accessory 100 for a mobile electronic device 110 as illustrated. In some embodiments, the holder is not user-adjustable but can comprise one or more of the components that is or are illustrated and/or described in this specification to help a user to hold the holder and/or mobile electronic device. In some embodiments, the holder is also referred to as a "handle" for convenience. As shown, the handle 100 may include a grip portion 102, one or more pivot portions 104 and 106, and a mounting component 108. The handle 100 shown in FIGS. 1-3 is illustrative only, and is not intended to be limiting. In some embodiments, the handle 100 may include one or multiple grip portions, one or multiple pivot portions, one or multiple mounting components, or any combination thereof.

The handle 100 may be used with a mobile electronic device 110, such as a mobile phone, tablet computer, media player, or the like. As shown in FIGS. 2A and 2B, the mobile electronic device 110 may have two substantially parallel, substantially planar faces: a user-facing or "front" face 204, and an opposing or "rear" face 202. Various components may be present on or under the rear face 202, such as a rear-facing onboard camera 220, onboard flash element 222, etc. Various components may be present on or under the front face 204, such as a user-facing onboard camera 240, display panel 242; etc. The mobile electronic device 110 shown in FIGS. 2A, and 2B and described herein is illustrative only, and is not intended to be limiting. In some embodiments, a handle 100 may be used with a variety of different mobile electronic devices, or may be configured for use with a specific mobile electronic device.

A user 120 may use the handle 100 to hold the mobile electronic device 110 in a more comfortable, convenient, and/or secure manner than may be easily achieved when holding the device 110 directly. For example, a user 120 may wish to take photographs, record videos, and perform various other operations using the mobile electronic device 110. Without using an accessory such as the handle 100 described herein, the photographic activities typically involve holding the mobile electronic device 110 with the user's fingertips on the edges of the mobile electronic device 110 so as not to cover or otherwise interfere with the display panel 242 and/or onboard cameras 220, 240. A user may then be required to move a finger in an awkward manner to activate an onboard camera 220, 240 (e.g., by touching a button displayed on the display panel 242 or pressing a physical button located somewhere on the outer housing of the mobile electronic device 110) while still maintaining a secure grip on the mobile electronic device 110. In many photographic situations, the user may need to hold the mobile electronic device 110 in a position extended away from or otherwise spaced apart from the user's body for long periods of time. Additionally, such activities may involve maintaining a consistent angle or orientation of the mobile electronic device 110 with respect to the user 120 and/or the subject being photographed (e.g., the subject may be positioned away from the user 120 and mobile electronic device 110 when using a rear-facing camera 220, or the subject may be the user 120 when using a user-facing camera 240). In some cases, photography and various other operations may require the user 120 to switch between two or more different angles or orientations of the mobile electronic device 110.

To facilitate use of the mobile electronic device 110 for photography and various other operations, a user 120 may attach or otherwise install a removably attachable handle 100 on a mobile electronic device 110. For example, as shown in FIGS. 1, 2A, and 2B, the mobile electronic device 110 may be inserted into the mounting component 108 of the handle 100. The mounting component 108 may securely hold the mobile electronic device 110 and prevent against accidental removal of the mobile electronic device 110 from the handle 100.

Figure 3C:
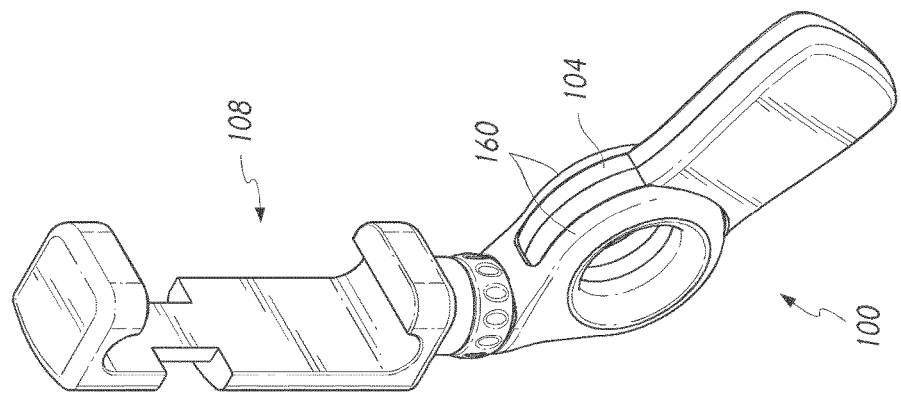
FIGS. 3A, 3B, and 3C illustrate different views of a user-adjustable handle for a mobile electronic device.
Figure 3B:
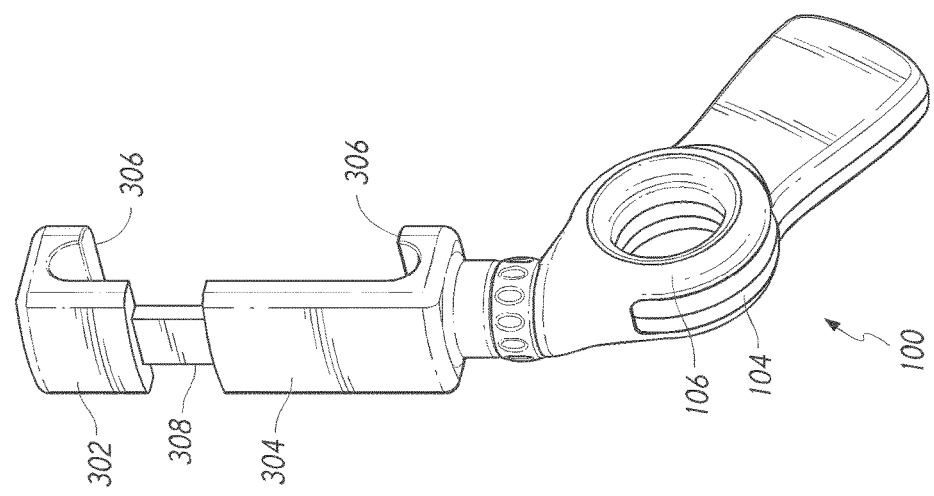
Figure 3A:
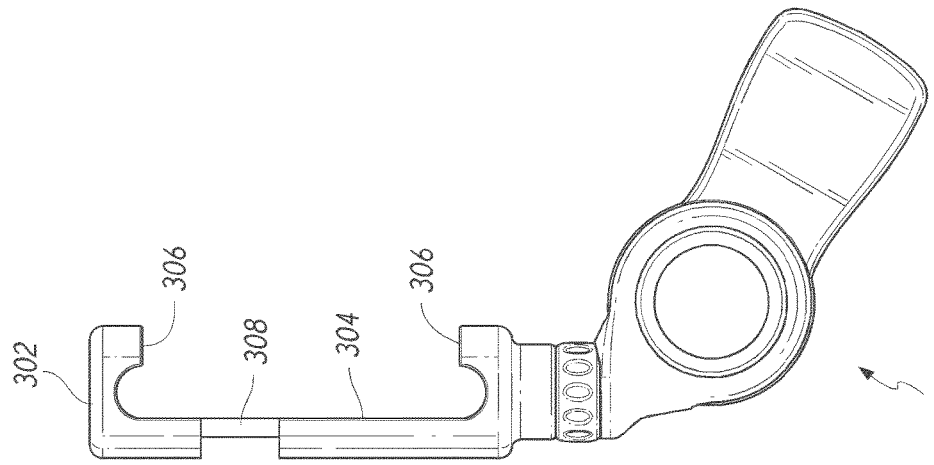

In some embodiments, as shown in FIGS. 3A, 3B, and 3C, the mounting component 108 may include an upper securement member 302 and a lower securement member 304. The securement members 302 and 304 may be integrated into a single mounting component 108, or one or both securement members 302 and 304 may be removable and re-attachable to the mounting component 108. For example, the upper securement member 302 may have an elongated member 308 configured to be inserted into an opening (not shown) in the lower securement member 304. A user may raise the upper securement member 302 away from the lower securement member 304, extending the elongated member 308 from the opening in the lower securement member 304. The raising of the upper securement member 302 with respect to the lower securement member 304 may increase a distance between holding portions 306 (e.g., hooks, arms, tabs, or other protrusions) that extend from one or both securement members 302, 304 and towards the other securement members 304, 302, respectively. The distance between the holding portions 306 may be increased so that the mobile electronic device 110 may be inserted into the mounting component 108 between the holding portions 306. A user may then lower the upper securement member 302 toward the lower securement member 304 such that the holding portions 306 are positioned to retain the mobile electronic device 110 within the mounting component 108, as shown in FIG. 2B. For example, the user may manually press upper securement member 302 toward the lower securement member 304, causing the elongated member 308 to be inserted into the opening in the lower securement member 304. The lower securement member 304 may be configured to grip or otherwise retain the elongated member 308 within the opening, such as via a friction fit, snap fit, or the like. In this way, the upper and lower securement members 302 and 304 may grip the mobile electronic device 110 or otherwise reduce the likelihood that the mobile electronic device 110 will be accidentally removed from the mounting component 108.

In some embodiments, a resilient mechanism such as a spring, elastic fiber, or the like may urge or bias the upper securement member 302 toward the lower securement member 304. The bias or urging of the upper member 302 toward the lower securement member 304 can cause the upper and lower securement members 302 and 304 to exert a gripping force on the mobile electronic device 110, helping to retain the mobile electronic device 110 within the mounting component 108. In some embodiments, a surface of the upper and/or lower securement members 302 and 304 that contacts the mobile electronic device 110 may be attached to, covered by, impregnated with, or made of a material with a relatively high coefficient of friction to help retain the mobile electronic device 110 within the mounting component 108 and reduce the likelihood of accidental removal of the mobile electronic device 110. For example, an interior surface of the upper and/or lower securement members 302 and 304 may be prepared such that the surface is tacky, rubbery, ribbed, or otherwise slide-resistant.

Figure 4:
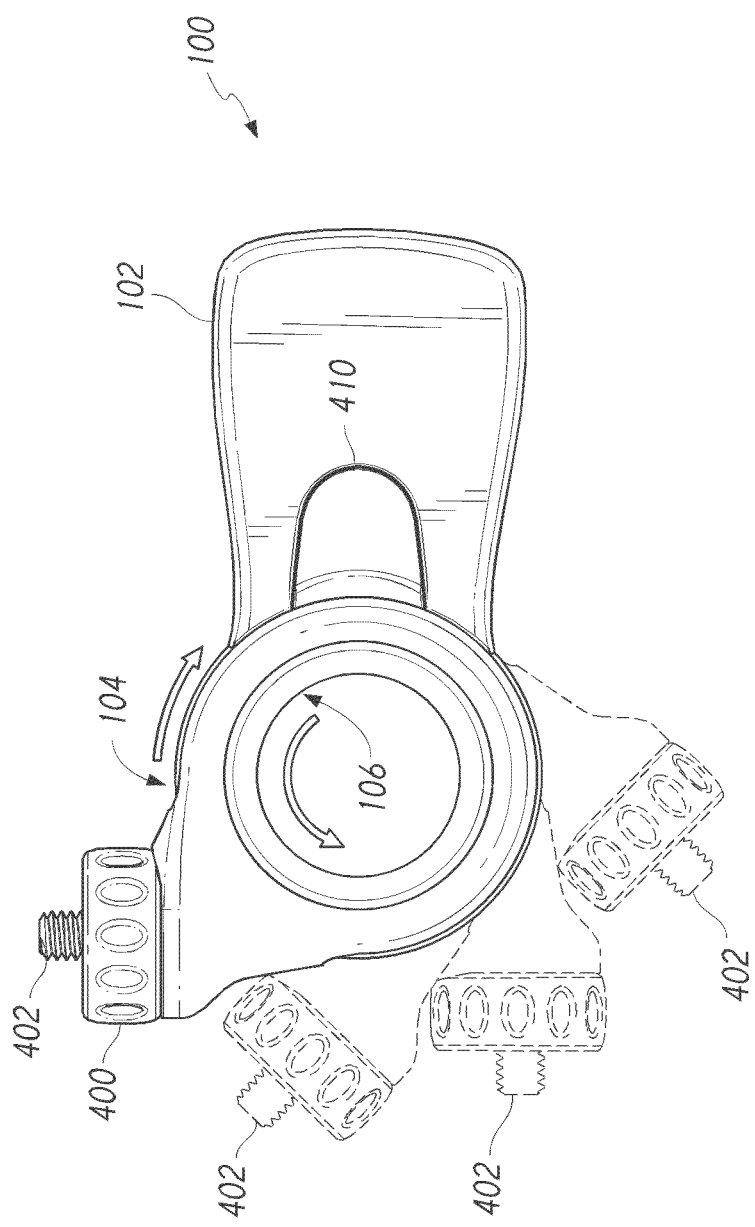
FIG. 4 illustrates a user-adjustable handle adjusted to several different positions.

In some embodiments, a mobile electronic device 110 may be attached to the handle 100 without using a securement member like the one shown in FIGS. 1-3. Instead, a mobile electronic device 110 may be coupled to the handle 100 using an alternative securement member, such as a threaded fastener, or any other type of securement member. For example, as shown in FIG. 4, the handle 100 may include a threaded portion 402. The threaded portion 402 may be screwed directly into a mobile electronic device 110, such as into a tripod attachment region of the mobile electronic device 110. In some embodiments, the threaded portion 402 may be screwed into a removably attachable protective case for a mobile electronic device 110, such as a case that includes a tripod attachment region. The threaded portion 402 may extend outward from a rotating grip 400. The rotating grip 400 may facilitate use of the threaded portion 402 (e.g., the threaded portion 402 may be screwed into a tripod attachment region by rotating the rotating grip 400). The rotating grip 400 may also or alternatively be used to rotate the mobile electronic device 110 with respect to the handle 100 when the mobile electronic device 110 is attached to the handle 100.

Returning to FIG. 1, a handle 100 may include an attachment region 180 to which accessories can be attached for use with the mobile electronic device 110 onto which the handle 100 has been installed. The accessories may include illumination components (e.g., flashes for flash photography), recording components (e.g., microphones), support components (e.g., tripods, other handles), other accessories, accessory mounting components, some combination thereof, etc. For example, a mounting component 108 may include one or more attachment regions 180 configured to receive accessories within a slot or track, such as a cold shoe or a hot shoe. A cold shoe does not typically provide electrical communication on, within, and/or through the mounting component 108 and/or other portions of the handle 100. A hot shoe can provide electrical communication on, within, and/or through the mounting component 108 and/or other portions of the handle 100. For convenience, in some embodiments, this specification refers separately to "cold shoe" and "hot shoe" attachment regions 180, but any reference anywhere in this specification to a cold shoe attachment region can applied to or used with a hot shoe attachment region, and any reference anywhere in this specification to a hot shoe attachment region can be applied to or used with a cold shoe attachment region. In some embodiments, the attachment region 180 may be configured to receive or otherwise mount accessories to the handle 100 in a different manner than a slot-based shoe.

As illustrated, the handle 100 can be configured so that a user 120 may hold the handle 100 by the grip portion 102. As shown, the handle 100 can be configured so that a user 120 may also insert a finger, such as an index finger 122, through an opening 146 in the handle 100. As illustrated, in some embodiments, the opening 146 can be circular. The opening 146 can facilitate a more secure and comfortable grip and/or provide more user-control over the position and/or orientation of the mobile electronic device than the grip portion 102 alone. The handle 100 can be configured so that a user 120 may insert an alternative finger into the opening 146, such as a thumb 124. In some embodiments, the opening 146 may be sized and/or shaped to allow insertion of multiple (e.g., two or more) fingers into the opening 146. In some embodiments, the opening 146 can be at least as wide as or about as wide as the thickness or width of a portion of the handle where the user grips the handle 100 with the user's fingers. In some embodiments, as shown, the opening 146 is at least as wide as or about as wide as the cross-sectional width or thickness of a juncture or rotating portion or rotating grip 400 where the portion of the holder that is configured to secure the mobile electronic device is coupled to or affixed to the portion of the holder that is configured to be held by the user. In some embodiments, the opening 146 is itself wider or larger than the region of the holder that borders or generally or completely surrounds the opening 146. In some embodiments, the grip 102 may include multiple openings to allow insertion of additional fingers, alternate placement of individual fingers, etc. In some embodiments, as shown, one or more opening edges or regions of the opening 146 on either or both sides of the handle 100 are smooth and/or curvilinear and/or that curve in toward the center of the opening 146 to provide comfortable contact with one or more of the user's fingers.

In some embodiments, the opening 146 may be formed by pivot portions 104 and 106. As shown, pivot portions 104 and 106 may have a "centerless" or "hubless" configuration, in which the opening 146 for the user's finger 122 is positioned at or near the point where different portions of the handle 100 pivot with respect to one another. For example, in some embodiments, as shown, the central pivoting axis about which the pivot portions 104, 106 pivot can be located within or pass through the opening 146 (such as at a geometric center of the opening 146). A user 120 may adjust the orientation of the mobile device 110 by rotating one or both pivot portions 104 and 106 with respect to each other. For example, as shown in FIG. 4, the pivot portions 104 and 106 may be rotated in opposite directions with respect to each other. The rotation of the pivot portions 104 and 106 in opposite directions with respect to each other (or the rotation of one pivot portion 104 or 106 with respect to the other pivot portion 106 or 104 that remains stationary) changes the angle formed by the grip portion 102 and the threaded portion 402. The mounting component 108 may be coupled to the threaded portion 402. Thus, the change in the angle between the grip portion 102 and the threaded portion 402 repositions/reorients the mobile electronic device 110 that has been installed in the mounting component 108. In this manner, a user 120 may adjust the orientation of the mobile electronic device 110 with respect to the user's line of sight, or with respect to an object in the mobile electronic device's field of view, without requiring the user 120 to maintain an uncomfortable or awkward wrist angle, hand position, arm position, etc.

In some embodiments, as shown in FIGS. 3B and 3C, one or both of pivot portions 104 and 106 may be hollow axles. For example, pivot portion 104 may be may be a hollow axle that is integrated with or coupled to the grip portion 102, and pivot portion 106 may be a hollow axle that is integrated with or coupled to the securement member 108. Pivot portion 104 may be partially or completely inserted into pivot portion 106 (or vice versa) or otherwise placed in a co-axial orientation with respect to pivot portion 106. For example, pivot portion 104 may be inserted into a slot, recess, opening, or other void between left and right portions 160 of pivot portion 106. In this position, the rotation axis of each of pivot portions 104 and 106 are aligned such that the pivot portions 104 and 106 are co-axial and form the opening 146 through the handle 100. When pivot portions 104 and 106 are co-axially oriented, the pivot portions 104 and 106 may be rotated with respect to each other without requiring any additional movement of the pivot portions 104, 106 (e.g., without any lateral movement of the rotation axis of either of the pivot portions 104, 106).

In some embodiments, as shown in FIG. 4, pivot portion 106 may be rotated through a range of a plurality of positions with respect to pivot portion 104 in order to position the threaded portion 402 (and, therefore, the securement member 108 and/or the mobile electronic device 110 coupled to the threaded portion 402) at any one of multiple positions with respect to the grip portion 102. For example, pivot portion 106 may be rotated to any of a discrete set of positions with respect to the pivot portion 104 to form a discrete set of angles between the threaded portion 402 and the grip portion 102 (e.g., about 90 degrees, about 135 degrees, about 180 degrees, and about 225 degrees). A user may use a control mechanism, such as a switch 410, button, or lever, to "unlock" the pivot portions 104, 106 and allow one or both to be rotated to a different position, as described in greater detail below. The user may then release or move the switch 410 to "lock" the pivot portions 104, 106 at a pre-set orientation with respect to each other, as also described in greater detail below. In some embodiments, the switch 410 may be biased or urged toward the locked state using, e.g., a resilient member such as a spring inside the grip portion 102.

The example positions and angles illustrated in FIG. 4 are illustrative only, and are not intended to be limiting. In some embodiments, pivot portion 106 may be rotated so that the threaded portion 402 forms less than about a 90 degree angle with grip portion 102, greater than about a 225 degree angle with grip portion 102, and/or fewer or additional angles between about 90 degrees and about 225 degrees. In some embodiments, the pivot portion 106 may be rotated so that the threaded portion 402 may be oriented at substantially any angle with respect to grip portion 102 (e.g., at dozens or more different angles), or may be adjusted to substantially any angle within a range of angles with respect to grip portion 102 (e.g., at dozes or more different angles between about 90 degrees and about 225 degrees).

FIG. 5B illustrates a cross section of the handle 100 shown in FIG. 5A along an "5B-5B" line, which corresponds to a vertical plane bisecting the handle 100 through the grip portion 102 and pivot portions 104, 106 into generally symmetrical left and right halves. As shown, the switch 410 may include or be coupled to one or more locking structures 412, such as detents, tabs, teeth, or protrusions that extend away from the switch 410. When the switch 410 is in a first "locked" position, the locking structures 412 mechanically resist the rotation of a positioning component 500, such as a gear, wheel, or spindle that is integrated with or coupled to the pivot portion 106. As shown, the locking structures 412 resist the rotation of the positioning component 500 by contacting corresponding locking structures 502, such as detents, tabs, teeth, or protrusions that extend radially outward from the positioning component 500.

The locking mechanism illustrated in FIG. 5B is illustrative only, and is not intended to be limiting. In some embodiments, some or all of the locking structures 412 may be recessed rather than extending away from the switch 410, and may therefore receive complementary locking structures 502 of the positioning component 500 when the switch 410 is in the first locked position. In some embodiments, some or all of the locking structures 502 may be recessed rather than extending radially outward from the positioning component 500, and may therefore receive complementary locking structures 412 of the switch 410 when the switch 410 is in the first locked position.

FIGS. 6B and 6C illustrates cross sections of the handle 100 shown in FIG. 6A along a "6B,6C-6B,6C" line, which corresponds to a vertical plane bisecting the handle 100 through pivot portions 104 and 106 into generally asymmetrical halves that are proximal and distal with respect to a user of the handle 100. Two positions for the switch 410 are shown in FIGS. 6B AND 6C: a first or "locked" position, and a second or "unlocked" position. When the switch 410 is in the first position shown in FIG. 6B, it is contacting one or more locking structures 502 of the positioning component 500 (or causing locking structures 412, not shown, to contact locking structures 502 of the positioning component 500). In this position, the switch 410 resists rotation of the positioning component 500, thereby temporarily locking or otherwise maintaining the positioning component 500 (and, therefore, the mobile electronic device 110) in place. A user may press the switch 410 inward with respect to the grip portion 102, moving the switch 410 along a path generally parallel to the rotation axis of the positioning component 500. The switch 410 may be moved at least partially into a void 600 within the handle 100. When the switch 410 is in this second position shown in FIG. 6C, it is no longer in contact with the locking structures 502 of the positioning component 500 or is otherwise not resisting rotation of the positioning component 500. Therefore, the user may rotate the positioning component 500 to another position, which causes the orientation of the mobile electronic device 110 to change with respect to the grip portion 102 of the handle 100. The user may then release the switch 410 or otherwise cause the switch 410 to move back to the first position, re-locking the positioning component 500 (and, therefore, the mobile electronic device 110) in place.

In some embodiments, the positioning component 500 may be locked and unlocked using other methods instead of, or in addition to, the switch 410 being moved in a direction generally parallel to the rotation axis of the positioning component 500. For example, the switch 410 may be moved in a direction that is generally orthogonal with respect to the rotation axis of the positioning component 500 and away from the locking structures 502 that extend radially from the positioning component 500. Other locking/unlocking configurations and mechanisms may be used.

Figure 7:
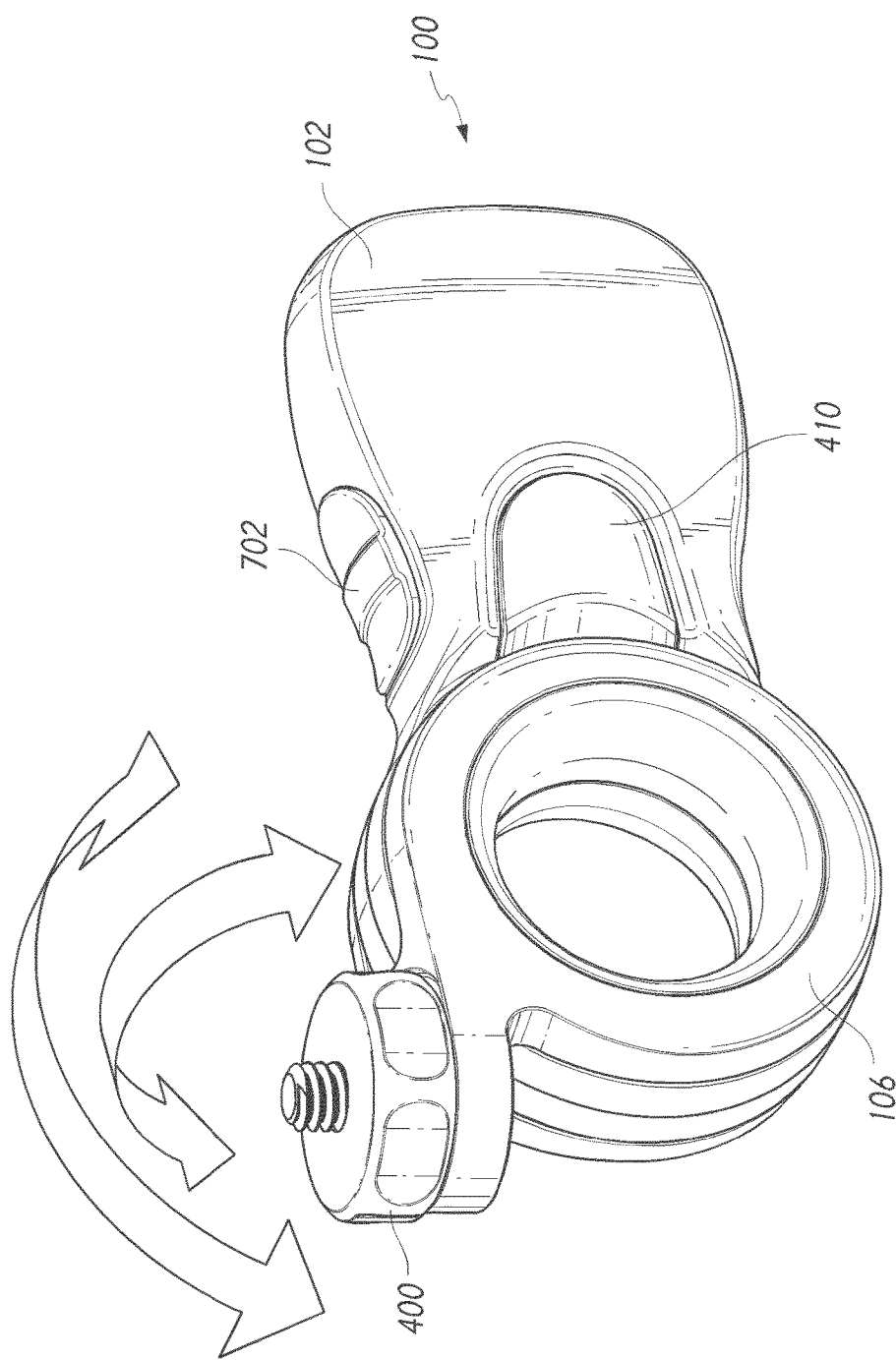
FIG. 7 illustrates a user-adjustable handle configured to be user-adjustable in multiple axes.
Figure 12:
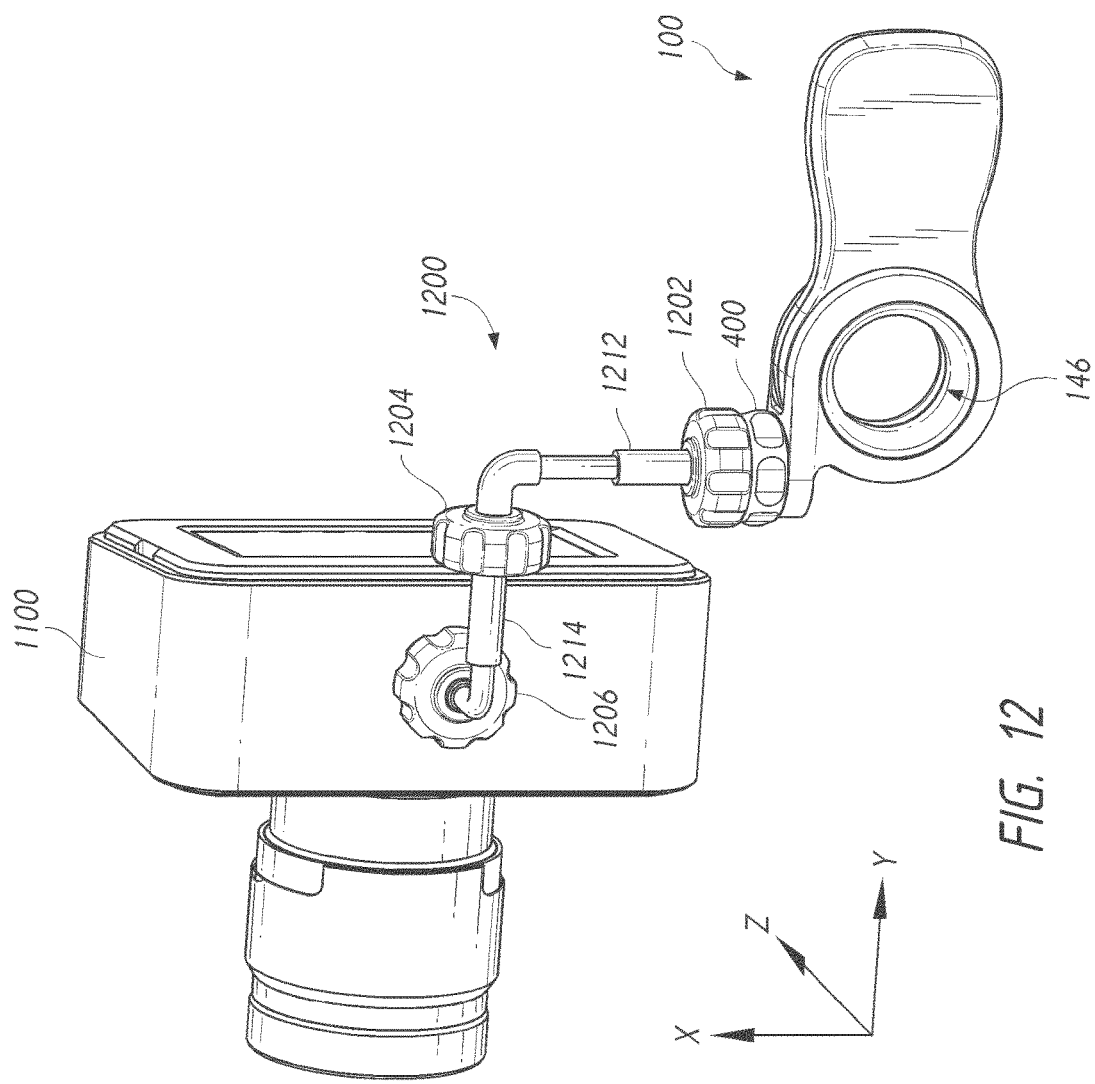
FIG. 12 illustrates a user-adjustable handle used with a gimbal and a photographic electronic device.

FIG. 7 illustrates another embodiment of a handle 100. The handle 100 shown in FIG. 7 may also be adjusted to orient a mobile electronic device 110 at multiple different positions with respect to the grip portion 102. However, in addition moving through a proximal-distal range of positions with respect to the grip portion 102 and user as shown in FIG. 4, the handle 100 shown in FIG. 7 may also or alternatively be adjusted such that a mobile electronic device 110 can move laterally with respect to the grip portion 102 and user. For example, the handle 100 may include one or more additional pivot portions configured to rotate on a rotation axis that is generally orthogonal to, or otherwise not generally parallel with, the rotation axes of the pivot portions 104 and 106. As another example, the grip portion 102 may be coupled to pivot portion 104 via a rotating, swiveling, or pivoting mechanism that facilitates rotation of the grip portion. In any embodiment in this specification, including the embodiment illustrated in FIG. 7, a gimbal or other multi-axis pivoted support can be included in the holder to resist bumps or small movement or vibration during image capture and/or to help stabilize the holder or the mobile electronic device during image capture. The gimbal can include a plurality of pivots, such as three pivots, to adjust for movement in multiple dimensions, such as three dimensions. One example of a gimbal is shown in FIG. 12 and described in greater detail below.

The handle 100 shown in FIG. 7 also includes a user interface control 702, such as a button or switch. The user interface control 702 may be used to control one or more electronic features of the handle 100. For example, the handle 100 may include a battery and internal circuitry that provides auxiliary electrical power from the battery to the mobile electronic device 110. The user interface control 702 may allow a user to switch the auxiliary electrical power to the mobile electronic device 110 on and off. As another example, the handle 100 may include internal circuitry that facilitates communication with the mobile electronic device 110 (e.g., via a wired connection though a "hot shoe," or via a wireless connection such as a Bluetooth® or Wi-Fi connection between the handle and the mobile electronic device 110). A user may control one or more features of the mobile electronic device 110 using the user interface control 702, such as triggering the shutter of an onboard camera 220 or 240 to capture a photo, starting or stopping the recording of video captured via an onboard camera 220 or 240, or the like.

FIG. 8 illustrates an extension member 800 attached to a handle 100. The extension member 800 can be used to maintain a mobile electronic device 110 in a location extended away from the grip portion 102 of the handle 100. The extension member 800 may have a fixed length, or the extension member 800 may be telescoping or otherwise at least partially extendible and retractable. In some embodiments, the extension member 800 may be longer than a typical user's arm, thereby facilitating use of the mobile electronic device 110 from a location not readily available without a handle 100 and extension member 800. The extension member 800 may be integrated with the handle 100, or the extension member 800 may be removably attachable to the handle 100. For example, the threaded portion 402 may be screwed into a threaded recess within the extension member 800.

Figure 9A:
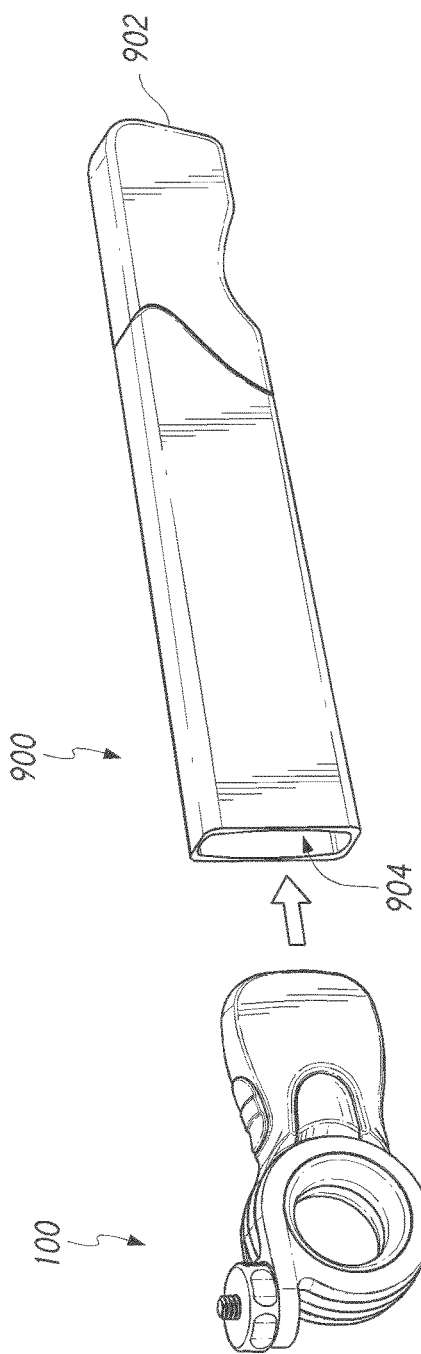
FIGS. 9A and 9B illustrate another example of a user-adjustable handle with an extension member.
Figure 9B:
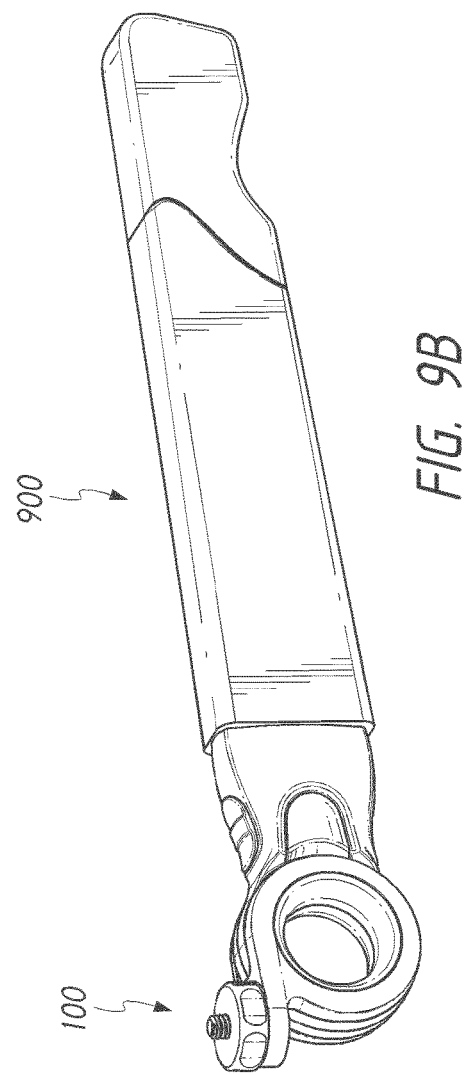

FIGS. 9A and 9B illustrate another embodiment of an extension member 900 attached to a handle 100. The extension member 900 can be used to maintain the handle 100, and therefore a mobile electronic device 110 attached to the handle 100, in a location extended away from a user. The extension member 900 may have a fixed length, or the extension member 900 may be telescoping or otherwise at least partially extendible and retractable. In some embodiments, the extension member 900 may be longer than a typical user's arm, thereby facilitating use of the mobile electronic device 110 from a location not readily available without a handle 100 and extension member 900. The extension member 900 may be integrated with the handle 100, or the extension member 900 may be removably attachable to the handle 100. For example, an opening 904 may be located at an end of the extension member 900 opposite a second grip portion 902. The opening 904 may be complementary to the grip portion 102 of the handle 100, or the opening 904 may otherwise be sized and/or shaped to receive the grip portion 102. The grip portion 102 may be retained within the opening 904 via a snap or friction fit. In some embodiments, a separate securement member such as a screw may be used to secure the handle 100 to the extension member.

Figure 10:
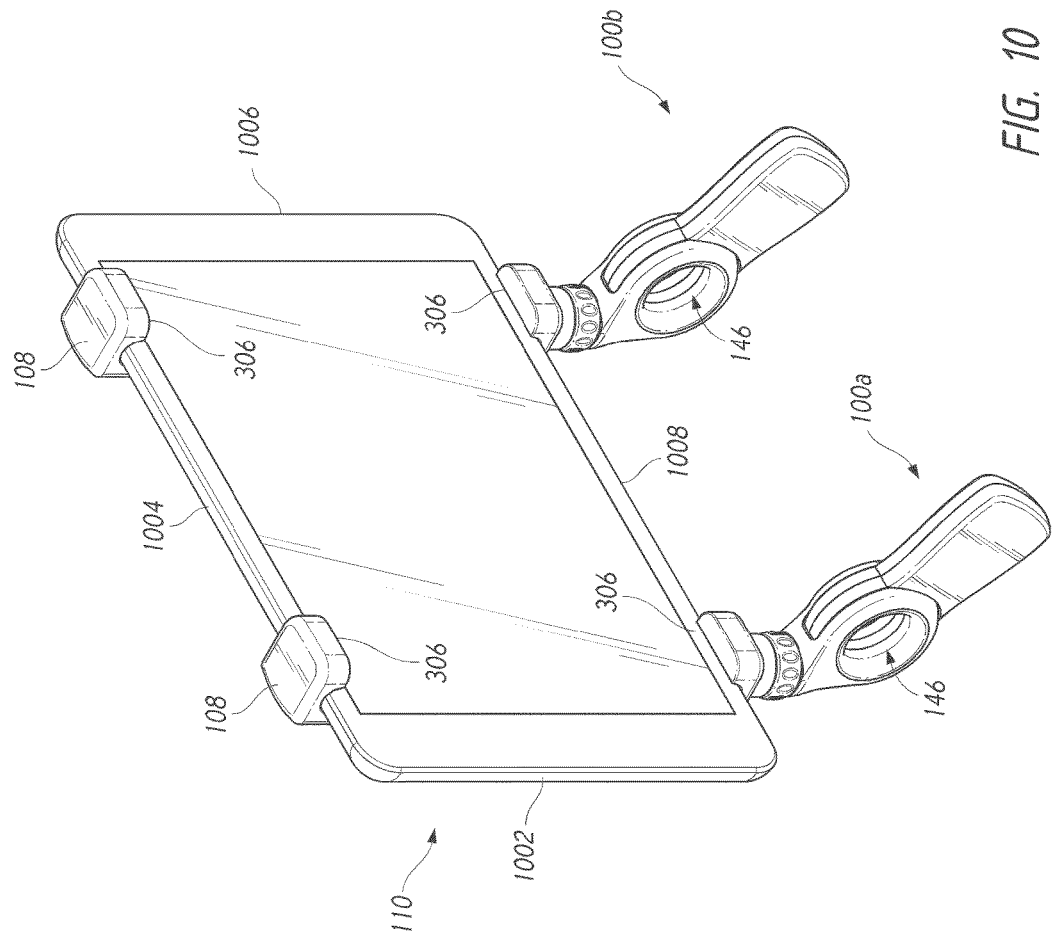
FIG. 10 illustrates use of two user-adjustable handles for holding a mobile electronic device.

FIG. 10 illustrates use of two handles 100*a*, 110*b* with a single mobile electronic device 110. In some embodiments, as illustrated, the handles 110*a*, 110*b* are separated from and non-unitary with each other and/or are attached to separate mounting components 108; and in some embodiments, the handles 110*a*, 110*b* are attached, either directly or indirectly, to each other, such as when the handles 110*a*, 110*b* are attached to a common support structure and/or one or more common mounting components 108. The mobile electronic device 110 is shown positioned in a "landscape" orientation in which its top edge 1004 and bottom edge 1008 are longer than its left and right lateral edges 1002 and 1006. In some embodiments, the mobile electronic device 110 may be positioned in a "portrait" orientation in which edges 1002 and 1006 are the top and bottom edges and are shorter than lateral edges 1004 and 1008. In some embodiments, the mobile electronic device 110 may be square or substantially square such that each edge 1002, 1004, 1006, and 1008 is about the same length as each other edge.

A first handle 100*a* can be removably attached to the mobile electronic device 110 in a region near a first lateral edge 1002 of the mobile electronic device 110, or otherwise closer to the first lateral edge 1002 than to a second lateral edge 1006. A second handle 100*b* can be removably attached to the mobile electronic device 110 in a region near the second lateral edge 1006, or otherwise closer to the second lateral edge 1006 than to the first lateral edge 1002. One or both of the handles 100*a*, 100*b* may be removably attached to the mobile electronic device 110 as described herein. For example, handle 100*a* and/or handle 100*b* may include a mounting component 108 with one or more holding portions 306 that secure the handle(s) 100*a* and/or 100*b* to the mobile electronic device 110.

A user may hold the mobile electronic device 110 with one hand on each handle 100*a*, 100*b*. Use of two handles may be advantageous when, e.g., the mobile electronic device 110 is relatively large and/or heavy, such as a tablet computing device. Two handles 100*a* and 100*b* may also or alternatively be advantageous when a steady grip on the device 110 is desired, such as in various photography and/or videography situations. One or both of the handles 100*a*, 100*b* may include an opening 146, as described herein, allowing a user to insert a finger through the pivoting portion of the handle to further facilitate secure and steady holding of the mobile electronic device 110. The handles 100*a*, 100*b* may also provide user interface controls that allow activation of certain functions, which may or may not be different for each handle. For example, handle 100*a* may provide a first user interface control that allows activation of a first function of the mobile electronic device 110 (e.g., activation of a camera), and handle 100*b* may provide a second user interface control that allows activation of a second function of the mobile electronic device 110 (e.g., adjustment of a zoom feature of the camera). Although the handles 100*a* and 100*b* are shown in FIG. 10 as being separate, in some embodiments the handles 100*a* and 100*b* may be attached to each other or integrated as a single mobile device holder. For example, an elongated member (not shown) may extend between the handles 100*a* and 100*b* to secure them to each other.

Figure 11:
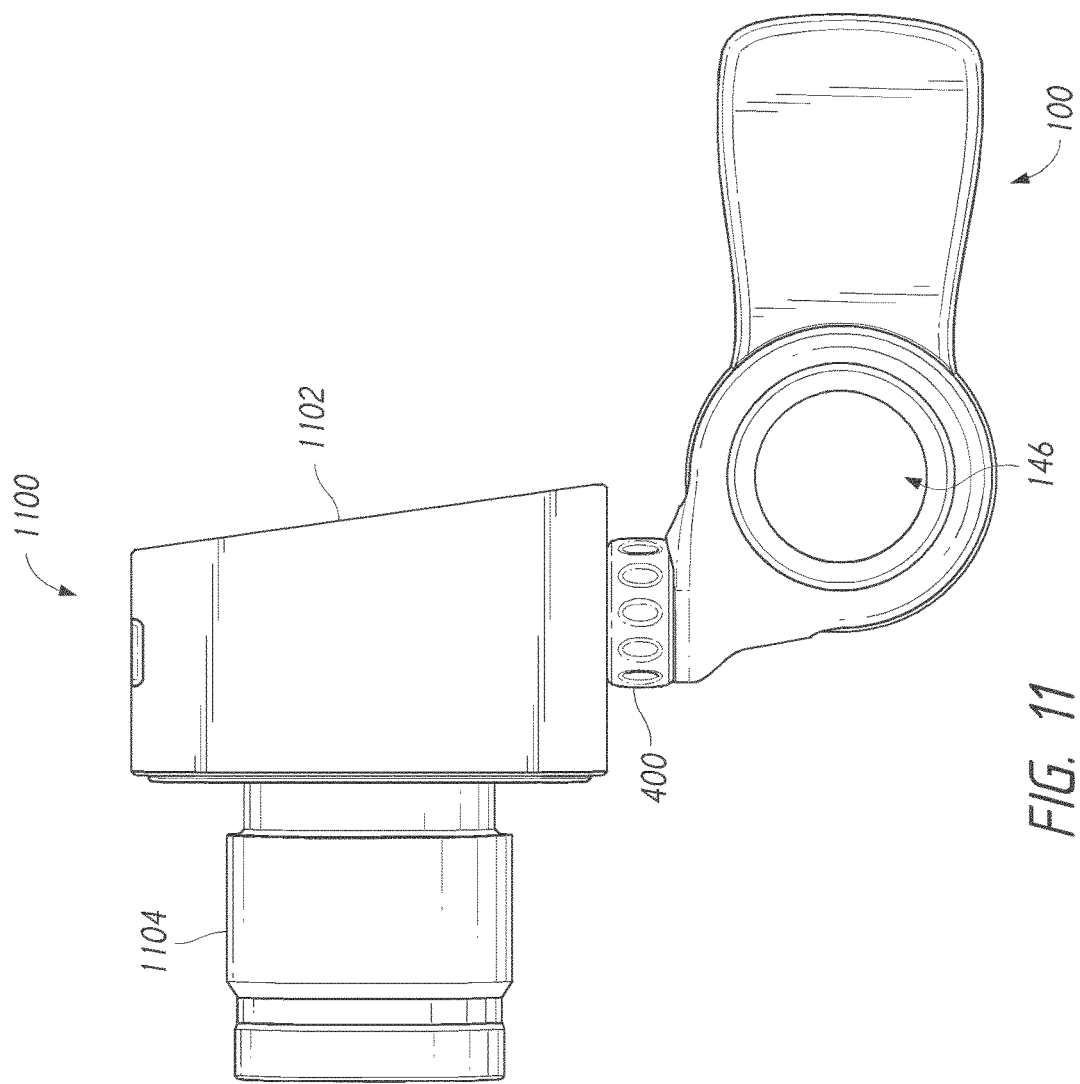
FIG. 11 illustrates a user-adjustable handle used with a photographic device.

FIG. 11 shows a handle 100 being used with a photographic device 1100, such as an electronic camera, that is permanently or removably attached to the handle 100. The photographic device 1100 may include a body 1102 in which various electronic components of the photographic device 1100 are housed within a housing. The photographic device 1100 may also include one or more lenses 1104. A lens assembly or lens 1104 may be embedded within and/or may extend away from the body 1102 of the photographic device 1100, as shown. In some embodiments a lens 1104 may be housed within or substantially within the body 1102 of the photographic device 1100.

The handle 100 may be removably attachable to the photographic device 1100. For example, the photographic device 1100 may include a securement portion, such as a threaded receptacle or any other securement portion. A securement member of the handle, such as a threaded portion that extends from the rotating grip 400 as described herein, may be screwed into the securement portion, thereby coupling the handle 100 to the photographic device 1100. In some embodiments, the photographic device 1100 may be integrated with the handle 100, or otherwise attached to the handle 100 such that the handle 100 is not readily removable from the body 1102 of the photographic device 1100 by user.

FIG. 12 shows another example of a handle 100 being used with a photographic device 1100. The handle 100 shown in FIG. 12 includes a multi-axis support component 1200, also referred to herein as a gimbal. The gimbal may be used to move, orient, and/or stabilize the photographic device 1100 (or some other mobile electronic device) in multiple different axes of rotation. To facilitate such orientation and/or stabilization, the gimbal 1200 may include a plurality of pivot portions. For example, as shown, the gimbal 1200 may include a first pivot portion 1202, a second pivot portion 1204, and a third pivot portion 1206. Each of the pivot portions 1202, 1204, and 1206 may allow rotation or other movement of various portions of the gimbal 1200. For example, one or more of the pivot portions 1202, 1204, and/or 1206 may include bearings and/or an axle configured to allow components coupled to the pivot portion(s) to be rotated through a variety of angles with respect to each other. In some embodiments, one or more of the pivot portions 1202, 1204, and/or 1206 may include or be controlled by a motor that automatically adjusts the rotation of the respective pivot portions. The motor(s) may be actuated by one or more buttons on the handle 100, by the photographic device 1100, or by some other component or device. In some embodiments, the motor(s) may actuate automatically to maintain the photographic device 1100 in a constant orientation with respect to the user, the photographic subject, the ground, or some other point of reference. As with all features, structures, materials, and steps disclosed and/or illustrated in this specification, the gimbal 1200 can be used with any other embodiment in this specification or with any other appropriate photographic structure or device.

In some embodiments, the first pivot portion 1202 may be integrated with or coupled to the handle 100, and may allow rotation around a first axis such as the substantially vertical "x" axis shown in FIG. 12. The second pivot portion 1204 may be coupled to the first pivot portion 1202, such via an elevating and/or offset member 1212. The elevating and/or offset member 1212 can be configured to permit the handle 100 to be elevated from the photographic device 1100 and/or offset from one or more axes of the photographic device 1100 to separate or remove the photographer from the photographic range of the photographic device 1100 and/or to provide a view or angle for the photographic device 1100 that would be uncomfortable or difficult for the user to maintain in a natural hand position. In some embodiments, the degree of elevation and/or offset of the member 1212 can be adjusted or changed statically or dynamically by the user. The second pivot portion 1204 may allow rotation around a second axis, such as the substantially horizontal "y" axis shown in FIG. 12 that is orthogonal to the first axis. The third pivot portion 1206 may be coupled to the second pivot portion 1204, such via member 1214. The third pivot portion 1206 may allow rotation around a third axis, such as the substantially horizontal "z" axis shown in FIG. 12 that is orthogonal to both the first and second axes.

Although the handle 100 with the gimbal component 1200 is shown in FIG. 12 as being used with a photographic device 1100, in some embodiments the handle 100 with the gimbal component 1200 may be used with any mobile electronic device 110, as described herein with respect to various embodiments of the handle 100.

Figure 13:
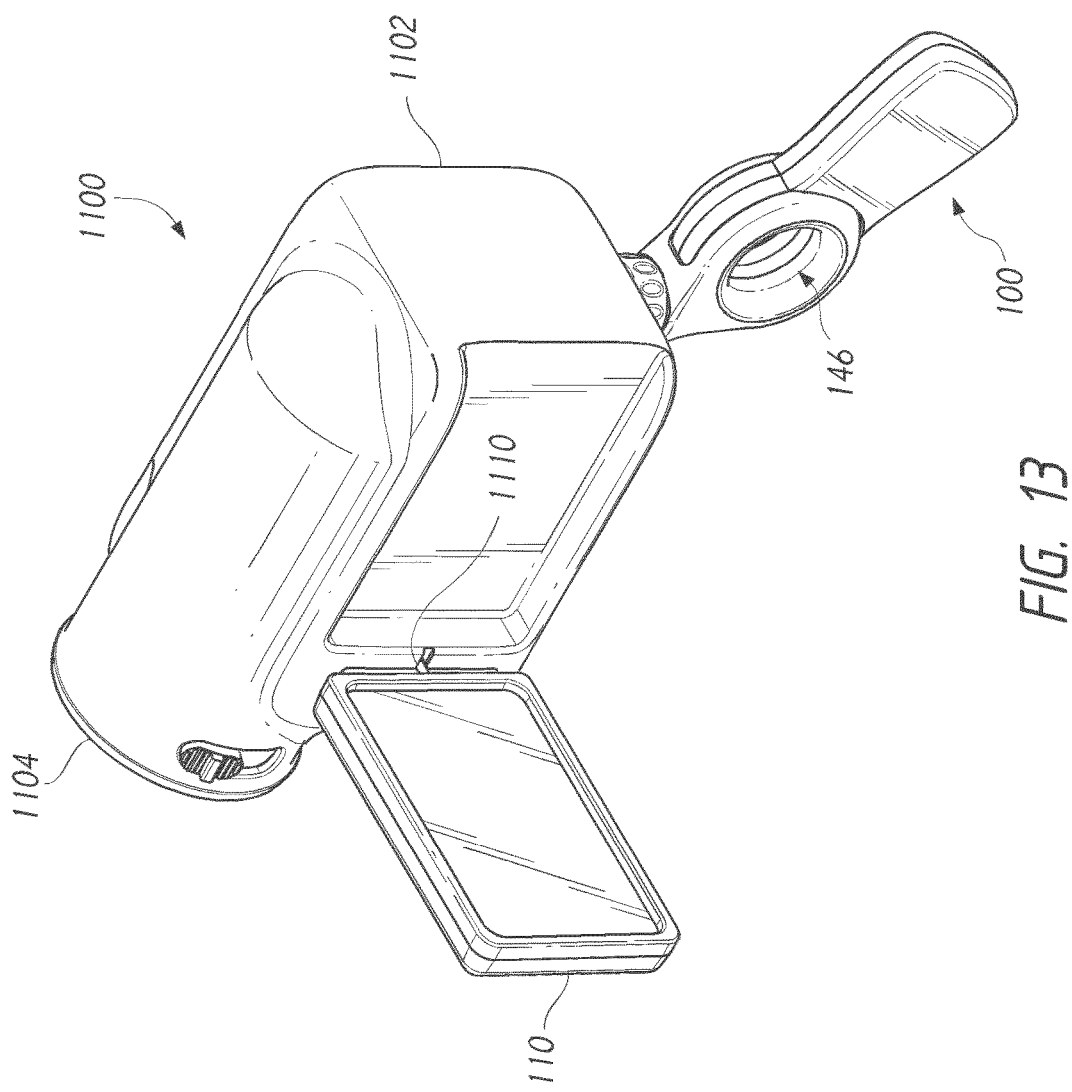
FIG. 13 illustrates a user-adjustable handle used with a photographic device and a mobile electronic device.

FIG. 13 shows another example of a handle 100 being used with a photographic device 1100. The photographic device 1100 shown in FIG. 13 is coupled to a mobile electronic device 110, such as a mobile phone. For example, the photographic device 1100 may be coupled to the mobile electronic device 110 via securement portion 1110. For example, the securement portion 1110 can be configured to suspend the mobile electronic device 110 at a level that is generally even with the level of the photographic device 1110 and/or the securement portion 1110 can be configured to permit a user to view a screen on the mobile electronic device 110 showing an image that has been communicated to the screen from the photographic device 1110. Securement portion 1110 may facilitate user-detachable coupling of the mobile electronic device 110 to the photographic device 1100. In some embodiments, the securement portion 1110 can provide mechanical and/or electronic attachment between the mobile electronic device 110 and the photographic device 1100. A user may couple the mobile electronic device 110 to the photographic device 1100 so that the user can hold both devices with one hand using one handle 100. In some embodiments, a user may use two handles as described above with respect to FIG. 10, as with all embodiments in this specification. For example, a first handle 100*a* may be removably attached to the mobile electronic device 110, and a second handle 100*b* may be removably attached or integrated with the photographic device 1100.

In some embodiments, the mobile electronic device 110 may display photographs and/or videos captured using the photographic device 1100, or the mobile electronic device 110 may serve to display a real time view of what is captured by one or more lenses 1104 of the photographic device 1100. The mobile electronic device 110 may be in wired communication with the photographic device 1100 (e.g., via the securement portion 1110), or the mobile electronic device 1109 may be in wireless communication with the photographic device 1100.

As with all embodiments in this specification, any structure, material, function, method, or step that is illustrated or described anywhere else in this specification can be used instead of or in addition to those illustrated or described in connection with FIGS. 11, 12, and/or 13.

All embodiments in this specification may be manufactured and/or assembled according to certain methods. For example, a method of manufacturing a holder configured to be removably attachable by a user to a mobile electronic device may include providing a grip portion, providing a securement portion configured to securely hold a mobile electronic device to which the holder is removably attached, and providing at least one pivot portion between the grip portion and the securement portion, wherein the at least one pivot portion is configured to orient the securement portion at a plurality of different angles with respect to the grip portion, and wherein the at least one pivot portion includes an opening for receiving a finger of a user of the holder.

The following is claimed:

1. A holder configured to be removably attachable by a user to a mobile electronic device, the holder comprising:
   a grip portion;
   a first pivot portion extending from the grip portion;
   a mounting portion configured to securely hold a mobile electronic device to which the holder is removably attached; and
   a second pivot portion extending from the mounting portion and coupled to the first pivot portion between the grip portion and the mounting portion, wherein the first pivot portion and the second pivot portion cooperate to orient the mounting portion at a plurality of different angles with respect to the grip portion about a pivot axis, and wherein each of the first pivot portion and the second pivot portion defines an opening aligned with the pivot axis and configured for receiving a finger of a user of the holder.

2. The holder of claim 1, wherein each of the first pivot portion and the second pivot portion are configured to pivot about the pivot axis.

3. The holder of claim 1, wherein the pivot axis is located at a geometric center of at least one of the opening of the first pivot portion or the opening of the second pivot portion.

4. The holder of claim 1, wherein at least one the of the first pivot portion or the second pivot portion comprises a hollow axle about which the mounting portion rotates, and wherein the hollow axle defines one or both of the opening of the first pivot portion of the opening of the second pivot portion.

5. The holder of claim 1, further comprising a user interface control configured to activate a feature of the mobile electronic device.

6. The holder of claim 1, wherein the mounting portion is configured to securely hold the mobile electronic device such that a display of the mobile electronic device is facing the user of the holder, and an onboard camera lens of the mobile electronic device is facing away from the user.

7. The holder of claim 1, wherein:
the mounting portion comprises:
an upper securement member; and
a lower securement member;
the upper securement member and the lower securement member are moveable away from one another to allow the mobile electronic device to be inserted into the mounting portion; and
the upper securement member is further configured to move towards the lower securement member and exert a gripping force on the mobile electronic device.

8. The holder of claim 1, wherein the mounting portion comprises at least one of a cold shoe or a hot shoe.

9. The holder of claim 1, further comprising a multi-axis support coupled to the mounting portion, wherein the multi-axis support is configured to adjust the orientation of the mounting portion in a plurality of axes with respect to the grip portion.

10. The holder of claim 1, further comprising an extension member configured to be removably attachable to the grip portion, wherein the extension member provides an increase in distance between the user of the holder and the mobile electronic device.

11. The holder of claim 1, further comprising an extension member configured to be removably attachable to the mounting portion, wherein the extension member provides an increase in distance between the user of the holder and the mobile electronic device.

12. The holder of claim 1, wherein:
the second pivot portion has a left portion and a right portion, wherein
the left portion and the right portion are spaced apart from one another to define a slot therebetween; and
the opening of the second pivot portion extends through each of the left portion and the right portion; and
the first pivot portion is positioned within the slot such that the opening of the first pivot portion aligns with the opening of the second pivot portion.

13. The holder of claim 1, wherein the first pivot portion extends directly from the grip portion, such that at least a portion of the opening for receiving the finger of the user is defined through the grip portion.

14. The holder of claim 1, further comprising:
a positioning component operably connected to the second pivot portion and the mounting portion; and
a locking mechanism coupled to the grip portion, wherein the locking mechanism interacts with the positioning component to selectively secure the mounting portion at a select angle among the different angles.

15. The holder of claim 9, wherein the multi-axis support comprises a gimbal configured to adjust the orientation of the mounting portion in three axes with respect to the grip portion.

16. A photographic device comprising:
a grip portion defining a grip portion opening;
a camera portion; and
at least one pivot portion between the grip portion and the camera portion, wherein the at least one pivot portion is configured to orient the camera portion at a plurality of different angles with respect to the grip portion, and wherein the at least one pivot portion includes a pivot portion opening aligned with the grip portion opening for receiving a finger of a user through both the pivot portion opening and the grip portion opening.

17. The photographic device of claim 16, further comprising a multi-axis support configured to adjust the orientation of the camera portion in a plurality of axes with respect to the grip portion.

18. The photographic device of claim 16, wherein the at least one pivot portion comprises a hollow axle about which the camera portion rotates, and wherein the hollow axle defines one or both of the grip portion opening or the pivot portion opening.

19. The photographic device of claim 16, further comprising a mounting portion configured to secure a mobile electronic device to the photographic device.

20. A holder configured to be removably attachable by a user to a mobile electronic device, the holder comprising:
a grip portion;
a mounting portion configured to securely hold a mobile electronic device to which the holder is removably attached; and
at least one pivot portion between the grip portion and the mounting portion, wherein the at least one pivot portion is configured to orient the mounting portion at a plurality of different angles with respect to the grip portion, and wherein the at least one pivot portion includes an opening for receiving a finger of a user of the holder, and wherein the opening for receiving the finger of the user has a diameter at least as large as a thickness of the grip portion.

21. The holder of claim 20, wherein:
the at least one pivot portion includes:
a first pivot portion extending from the grip portion; and
a second pivot portion extending from the mounting portion; and
the first pivot portion and the second pivot portion are pivotally coupled to one another between the grip portion and the mounting portion.

22. The holder of claim 21, wherein the opening extends through each of the first pivot portion and the second pivot portion.

23. The holder of claim 21, wherein:
the first pivot portion and the second pivot portion are pivotally coupled about a pivot axis; and
the opening is aligned with the pivot axis.

24. A holder configured to be removably attachable by a user to a mobile electronic device, the holder comprising:

a grip portion;

a mounting portion configured to securely hold a mobile electronic device to which the holder is removably attached; and at least one pivot portion between the grip portion and the mounting portion, wherein the at least one pivot portion is configured to orient the mounting portion at a plurality of different angles with respect to the grip portion, and wherein the at least one pivot portion includes an opening for receiving a finger of a user of the holder, and wherein a pivot axis is located at a geometric center of the opening.

25. A holder configured to be removably attachable by a user to a mobile electronic device, the holder comprising:

a grip portion;

a mounting portion configured to securely hold a mobile electronic device to which the holder is removably attached;

at least one pivot portion between the grip portion and the mounting portion, wherein the at least one pivot portion is configured to orient the mounting portion at a plurality of different angles with respect to the grip portion, and wherein the at least one pivot portion includes an opening for receiving a finger of a user of the holder; and a multi-axis support coupled to the mounting portion, wherein the multi-axis support is configured to adjust the orientation of the mounting portion in a plurality of axes with respect to the grip portion.

* * * * *